US 11,728,869 B2

(12) United States Patent
Raghavan et al.

(10) Patent No.: US 11,728,869 B2
(45) Date of Patent: Aug. 15, 2023

(54) COMMUNICATIONS USING DYNAMIC BEAM WEIGHTS

(71) Applicant: QUALCOMM Incorporated, San Diego, CA (US)

(72) Inventors: Vasanthan Raghavan, West Windsor Township, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/454,684

(22) Filed: Nov. 12, 2021

(65) Prior Publication Data

US 2023/0155656 A1 May 18, 2023

(51) Int. Cl.
*H04L 5/12* (2006.01)
*H04B 7/06* (2006.01)
*H04B 7/0426* (2017.01)
*H04B 7/0456* (2017.01)

(52) U.S. Cl.
CPC ........... *H04B 7/0639* (2013.01); *H04B 7/043* (2013.01); *H04B 7/0482* (2013.01); *H04B 7/0695* (2013.01)

(58) Field of Classification Search
CPC .... H04B 7/0639; H04B 7/043; H04B 7/0482; H04B 7/0695
USPC ........ 375/262, 261, 260, 259, 219, 295, 316
See application file for complete search history.

(56) References Cited

U.S. PATENT DOCUMENTS

| 2016/0359533 A1* | 12/2016 | Obara | H04B 7/0848 |
| 2019/0296821 A1* | 9/2019 | Choi | H04B 7/0617 |
| 2021/0218461 A1 | 7/2021 | Raghavan et al. | |

FOREIGN PATENT DOCUMENTS

| EP | 2246937 B1 | 8/2015 |
| WO | 2006138555 A2 | 12/2006 |

OTHER PUBLICATIONS

International Search Report and Written Opinion—PCT/US2022/077349—ISA/EPO—dated Dec. 5, 2022.

* cited by examiner

*Primary Examiner* — Zewdu A Kassa
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may determine, based at least in part on at least one of a plurality of conditions being met, to switch from a static analog beamforming codebook to a dynamic analog beamforming beam weight calculation for selecting beam weights for communications between the UE and a base station. The UE may select the beam weights for the communications using the dynamic beam weight calculation. The UE may communicate, using the beam weights, with the base station. Numerous other aspects are described.

30 Claims, 11 Drawing Sheets

COMMUNICATIONS USING DYNAMIC BEAM WEIGHTS

FIELD OF THE DISCLOSURE

Aspects of the present disclosure generally relate to wireless communication and to techniques and apparatuses for communications using dynamic beam weights.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include determining, based at least in part on at least one of a plurality of conditions being met, to switch from a static analog beamforming codebook to a dynamic analog beamforming beam weight calculation for selecting beam weights for communications between the UE and a base station. The method may include selecting the beam weights for the communications using the dynamic beam weight calculation. The method may include communicating, using the beam weights, with the base station.

Some aspects described herein relate to a method of wireless communication performed by a base station. The method may include transmitting, to a UE, configuration information indicating that the UE is to switch, based at least in part on at least one of a plurality of conditions being met, from a static analog beamforming codebook to a dynamic analog beam weight calculation for selecting beam weights for communications between the UE and the base station. The method may include receiving, from the UE, a request for one or more reference signals associated with the dynamic beam weight calculation. The method may include transmitting, to the UE, the one or more reference signals.

Some aspects described herein relate to a UE for wireless communication. The user equipment may include a memory and one or more processors coupled to the memory. The one or more processors may be configured to determine, based at least in part on at least one of a plurality of conditions being met, to switch from a static analog beamforming codebook to a dynamic analog beam weight calculation for selecting beam weights for communications between the UE and a base station. The one or more processors may be configured to select the beam weights for the communications using the dynamic beam weight calculation. The one or more processors may be configured to communicate, using the beam weights, with the base station.

Some aspects described herein relate to a base station for wireless communication. The base station may include a memory and one or more processors coupled to the memory. The one or more processors may be configured to transmit, to a UE, configuration information indicating that the UE is to switch, based at least in part on at least one of a plurality of conditions being met, from a static codebook to a dynamic beam weight calculation for selecting beam weights for communications between the UE and the base station. The one or more processors may be configured to receive, from the UE, a request for one or more reference signals associated with the dynamic beam weight calculation. The one or more processors may be configured to transmit, to the UE, the one or more reference signals.

Some aspects described herein relate to a non-transitory computer-readable medium that stores a set of instructions for wireless communication by a UE. The set of instructions, when executed by one or more processors of the UE, may cause the UE to determine, based at least in part on at least one of a plurality of conditions being met, to switch from a static analog beamforming codebook to a dynamic analog beam weight calculation for selecting beam weights for communications between the UE and a base station. The set of instructions, when executed by one or more processors of the UE, may cause the UE to select the beam weights for the communications using the dynamic beam weight calculation. The set of instructions, when executed by one or more processors of the UE, may cause the UE to communicate, using the beam weights, with the base station.

Some aspects described herein relate to a non-transitory computer-readable medium that stores a set of instructions for wireless communication by a base station. The set of instructions, when executed by one or more processors of the base station, may cause the base station to transmit, to a UE, configuration information indicating that the UE is to switch, based at least in part on at least one of a plurality of conditions being met, from a static analog beamforming codebook to a dynamic analog beam weight calculation for selecting beam weights for communications between the UE and the base station. The set of instructions, when executed by one or more processors of the base station, may cause the base station to receive, from the UE, a request for one or more reference signals associated with the dynamic beam weight calculation. The set of instructions, when executed by one or more processors of the base station, may cause the base station to transmit, to the UE, the one or more reference signals.

Some aspects described herein relate to an apparatus for wireless communication. The apparatus may include means for determining, based at least in part on at least one of a plurality of conditions being met, to switch from a static analog beamforming codebook to a dynamic analog beam weight calculation for selecting beam weights for communications between the UE and a base station. The apparatus may include means for selecting the beam weights for the communications using the dynamic beam weight calculation. The apparatus may include means for communicating, using the beam weights, with the base station.

Some aspects described herein relate to an apparatus for wireless communication. The apparatus may include means for transmitting, to a UE, configuration information indicating that the UE is to switch, based at least in part on at least one of a plurality of conditions being met, from a static analog beamforming codebook to a dynamic analog beam weight calculation for selecting beam weights for communications between the UE and the base station. The apparatus may include means for receiving, from the UE, a request for one or more reference signals associated with the dynamic beam weight calculation. The apparatus may include means for transmitting, to the UE, the one or more reference signals.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
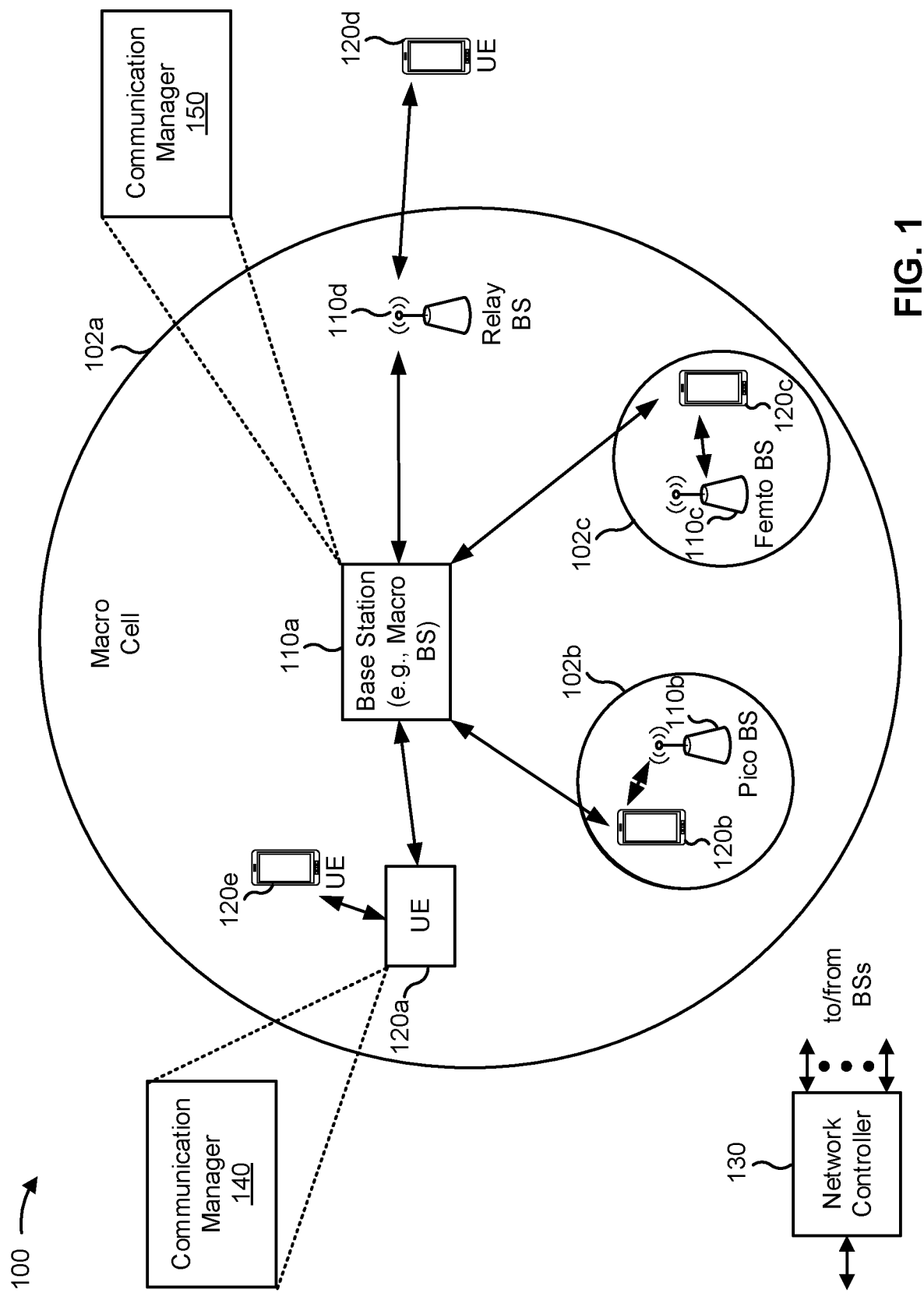
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may determine, based at least in part on at least one of a plurality of conditions being met, to switch from a static analog beamforming codebook to a dynamic analog beamforming beam weight calculation for selecting beam weights for communications between the UE and a base station; select the beam weights for the communications using the dynamic beam weight calculation; and communicate, using the beam weights, with the base station. Additionally, or alternatively, the communication manager 140 may perform one or more other operations described herein.

In some aspects, the base station 110 may include a communication manager 150. As described in more detail elsewhere herein, the communication manager 150 may transmit, to a user equipment (UE), configuration information indicating that the UE is to switch, based at least in part on at least one of a plurality of conditions being met, from a static analog beamforming codebook to a dynamic analog beam weight calculation for selecting beam weights for communications between the UE and the base station; receive, from the UE, a request for one or more reference signals associated with the dynamic beam weight calculation; and transmit, to the UE, the one or more reference signals. Additionally, or alternatively, the communication manager 150 may perform one or more other operations described herein.

As indicated above, FIG. 1 is provided as an example. Other examples may differ from what is described with regard to FIG. 1.

Figure 2:
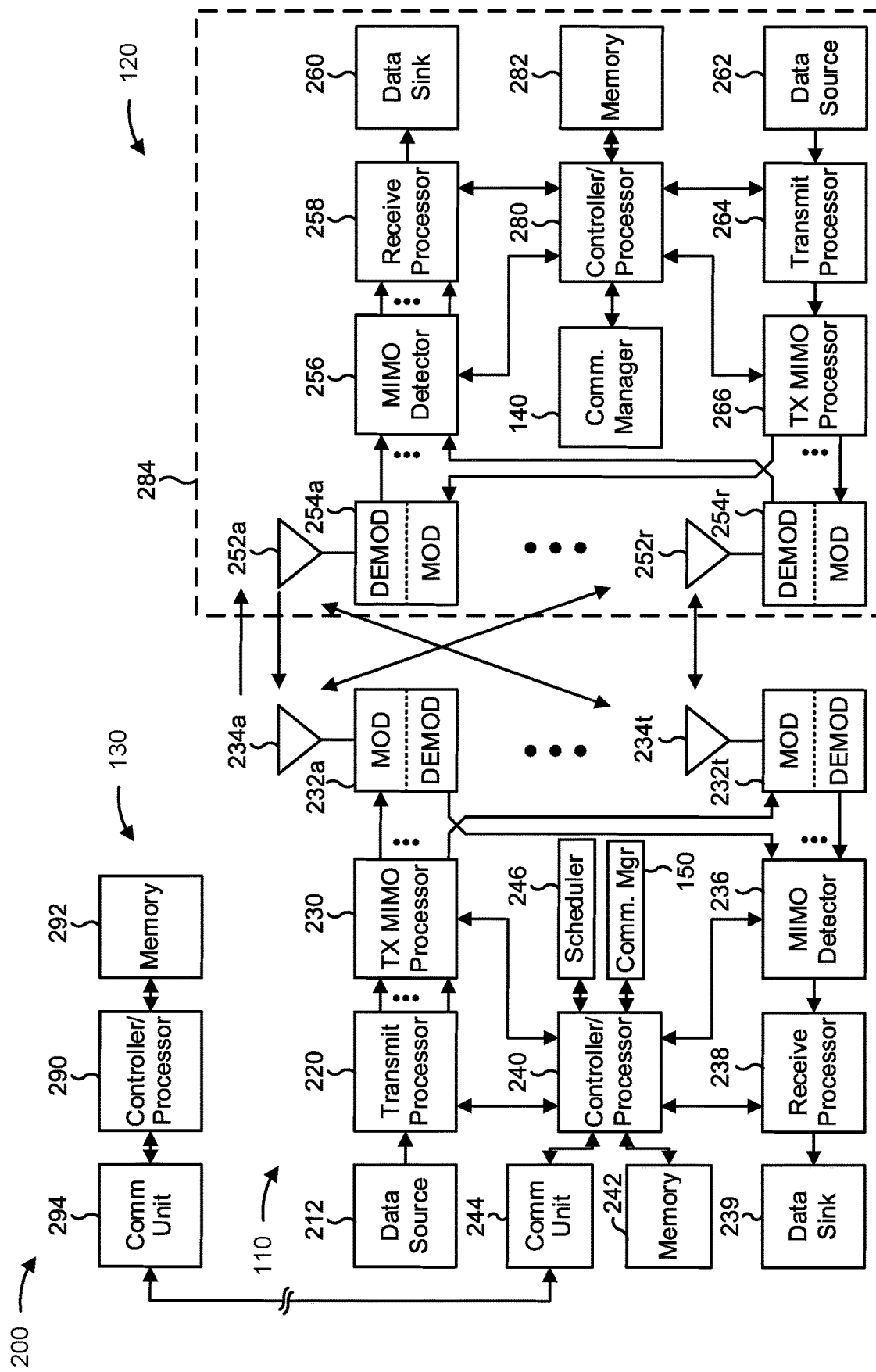
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-11).

The controller/processor 240 of the base station 110, the controller/processor 280 of the UE 120, and/or any other component(s) of FIG. 2 may perform one or more techniques associated with communications using dynamic beam weights, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE includes means for determining, based at least in part on at least one of a plurality of conditions being met, to switch from a static analog beamforming codebook to a dynamic analog beamforming beam weight calculation for selecting beam weights for communications between the UE and a base station; means for selecting the beam weights for the communications using the dynamic beam weight calculation; and/or means for communicating, using the beam weights, with the base station. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting, to a user equipment (UE), configuration information indicating that the UE is to switch, based at least in part on at least one of a plurality of conditions being met, from a static analog beamforming codebook to a dynamic analog beam weight calculation for selecting beam weights for communications between the UE and the base station; means for receiving, from the UE, a request for one or more reference signals associated with the dynamic beam weight calculation; and/or means for transmitting, to the UE, the one or more reference signals. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
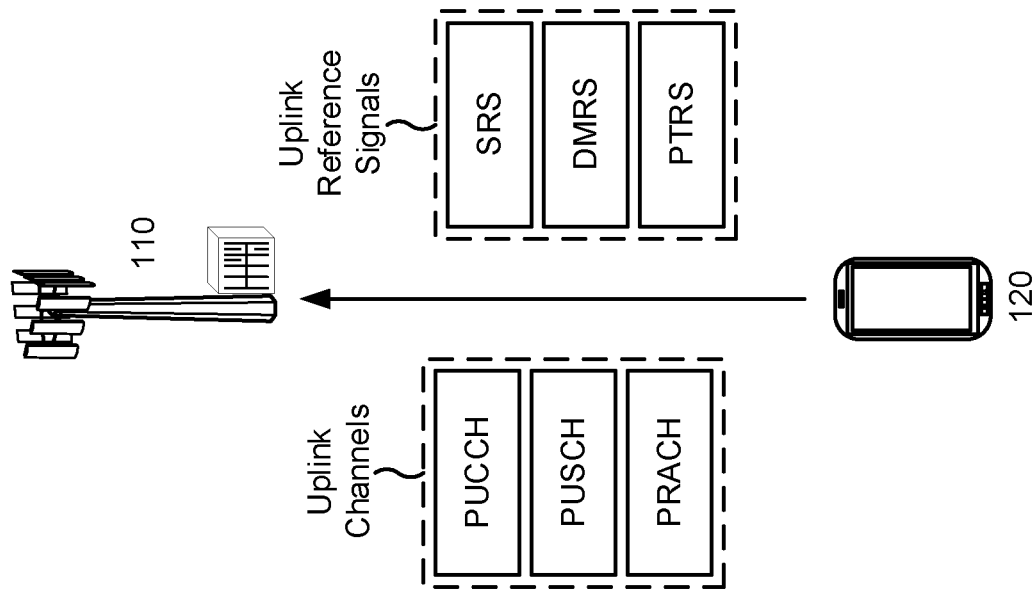
FIG. 3 is a diagram illustrating an example of physical channels and reference signals in a wireless network, in accordance with the present disclosure.
Figure 3:
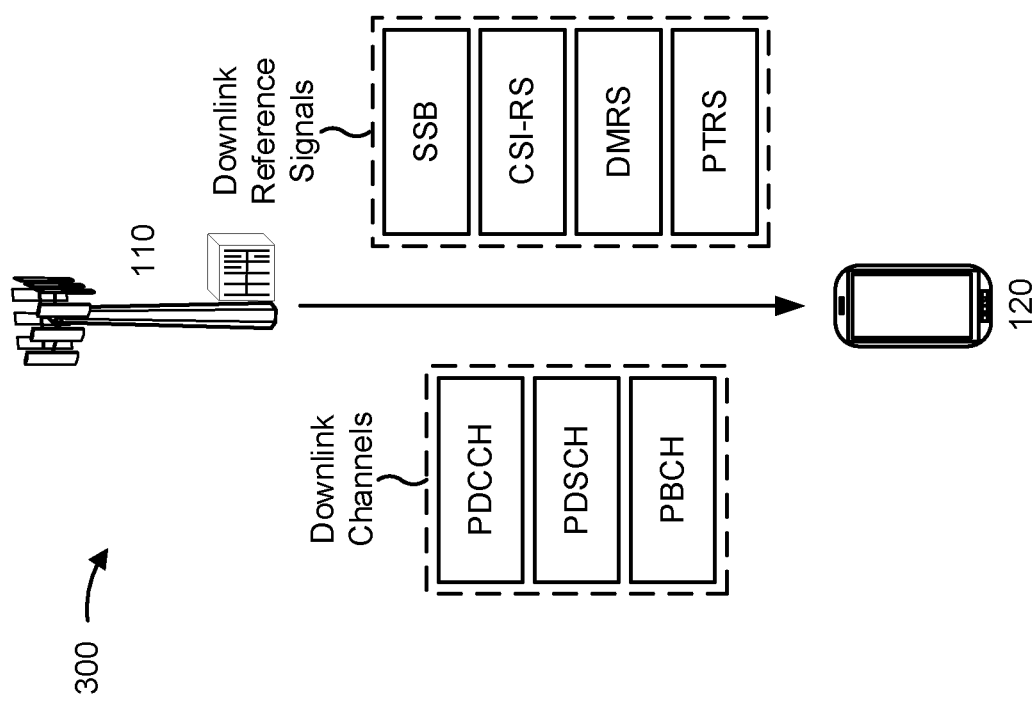

FIG. 3 is a diagram illustrating an example 300 of physical channels and reference signals (RSs) in a wireless network, in accordance with the present disclosure. As shown in FIG. 3, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a demodulation reference signal (DMRS), a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a channel quality indicator (CQI), a precoding matrix indicator (PMI), a CSI-RS resource indicator (CRI), a layer indicator (LI), a rank indicator (RI), or a reference signal received power (RSRP), among other examples. The base station 110 may use the CSI report to select transmission parameters for downlink communications to the UE 120, such as a number of transmission layers (e.g., a rank), a precoding matrix (e.g., a precoder), a modulation and coding scheme (MCS), or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. In some aspects, the configuration for an SRS resource set may indicate a use case (e.g., in an SRS-SetUse information element) for the SRS resource set. For example, an SRS resource set may have a use case of antenna switching, codebook, non-codebook, or beam management. The base station 110 may measure the SRSs, may perform channel estimation based at least in part on the measurements, and may use the SRS measurements to configure communications with the UE 120.

In some aspects, a codebook SRS resource set may be used to indicate uplink CSI when a base station 110 indicates an uplink precoder to the UE 120. For example, when the base station 110 is configured to indicate an uplink precoder to the UE 120 (e.g., using a precoder codebook), the base station 110 may use a codebook SRS (e.g., an SRS transmitted using a resource of a codebook SRS resource set) to acquire uplink CSI (e.g., to determine an uplink precoder to be indicated to the UE 120 and used by the UE 120 to communicate with the base station 110). In some aspects, virtual ports (e.g., a combination of two or more antenna ports) with a maximum transmit power may be supported at least for a codebook SRS.

In some aspects, a non-codebook SRS resource set may be used to indicate uplink CSI when the UE 120 selects an uplink precoder (e.g., instead of the base station 110 indicated an uplink precoder to be used by the UE 120. For example, when the UE 120 is configured to select an uplink precoder, the base station 110 may use a non-codebook SRS (e.g., an SRS transmitted using a resource of a non-codebook SRS resource set) to acquire uplink CSI. In this case, the non-codebook SRS may be precoded using a precoder selected by the UE 120 (e.g., which may be indicated to the base station 110).

A beam management SRS resource set may be used for indicating CSI for millimeter wave communications.

An SRS resource can be configured as periodic, semi-persistent (sometimes referred to as semi-persistent scheduling (SPS)), or aperiodic. A periodic SRS resource may be configured via a configuration message that indicates a periodicity of the SRS resource (e.g., a slot-level periodicity, where the SRS resources occurs every Y slots) and a slot offset. In some cases, a periodic SRS resource may always be activated, and may not be dynamically activated or deactivated. A semi-persistent SRS resource may also be configured via a configuration message that indicates a periodicity and a slot offset for the semi-persistent SRS resource, and may be dynamically activated and deactivated (e.g., using DCI or a medium access control (MAC) control element (CE) (MAC-CE)). An aperiodic SRS resource may be triggered dynamically, such as via DCI (e.g., UE-specific DCI or group common DCI) or a MAC-CE.

As indicated above, FIG. 3 is provided as an example. Other examples may differ from what is described with regard to FIG. 3.

Figure 4:
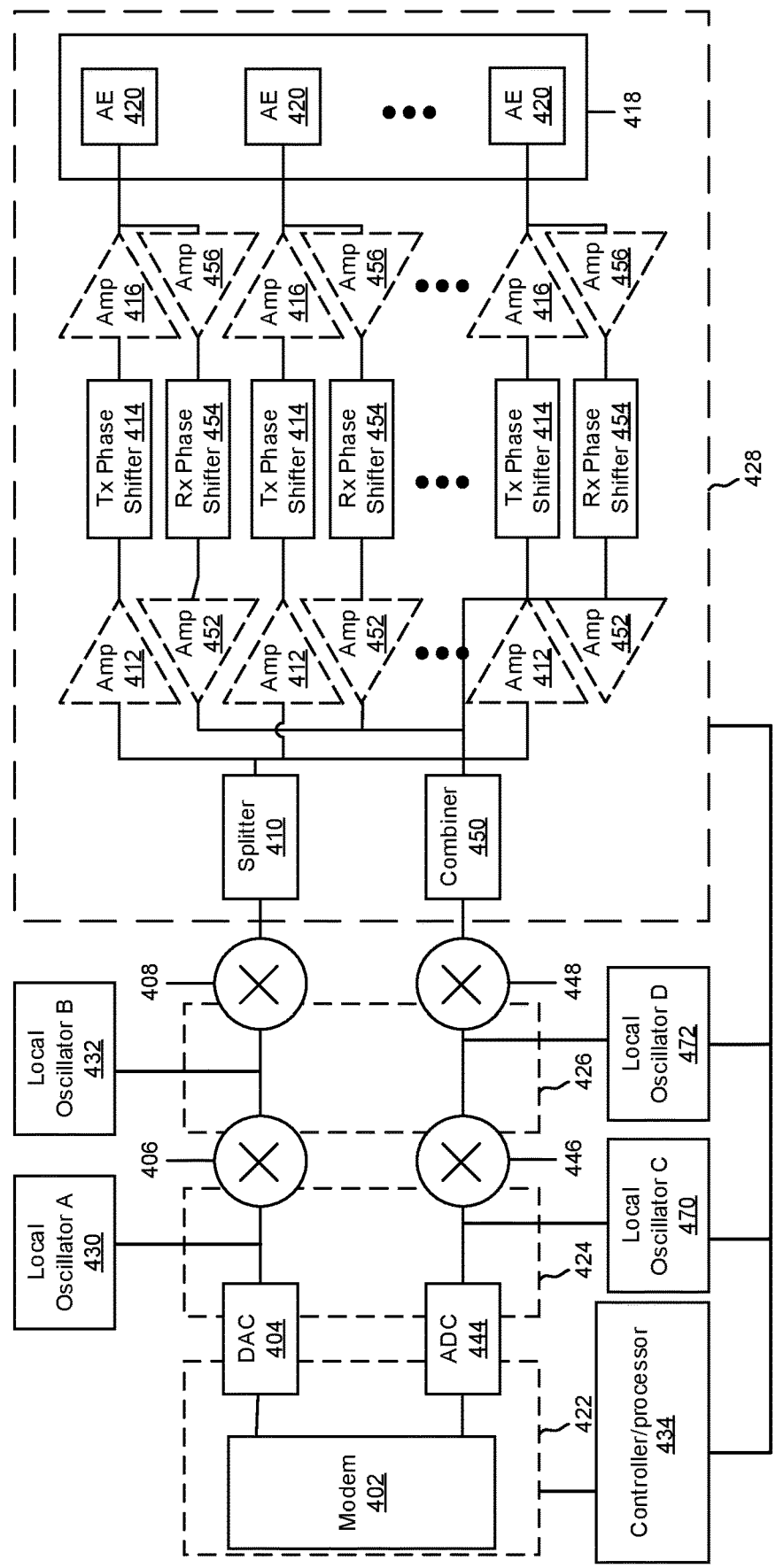
FIG. 4 is a diagram illustrating an example of beamforming architecture that supports beamforming for millimeter wave (mmW) communications, in accordance with the present disclosure.

FIG. 4 is a diagram illustrating an example beamforming architecture 400 that supports beamforming for millimeter wave (mmW) communications, in accordance with the present disclosure. In some aspects, architecture 400 may implement aspects of wireless network 100. In some aspects, architecture 400 may be implemented in a transmitting device (e.g., a first wireless communication device, UE, or base station) and/or a receiving device (e.g., a second wireless communication device, UE, or base station), as described herein.

Broadly, FIG. 4 is a diagram illustrating example hardware components of a wireless communication device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 400 includes a modem (modulator/demodulator) 402, a digital to analog converter (DAC) 404, a first mixer 406, a second mixer 408, and a splitter 410. The architecture 400 also includes multiple first amplifiers 412, multiple phase shifters 414, multiple second amplifiers 416, and an antenna array 418 that includes multiple antenna elements 420. In some examples, the modem 402 may be one or more of the modems 232 or modems 254 described in connection with FIG. 2.

Transmission lines or other waveguides, wires, and/or traces are shown connecting the various components to illustrate how signals to be transmitted may travel between components. Reference numbers 422, 424, 426, and 428 indicate regions in the architecture 400 in which different types of signals travel or are processed. Specifically, reference number 422 indicates a region in which digital baseband signals travel or are processed, reference number 424 indicates a region in which analog baseband signals travel or are processed, reference number 426 indicates a region in which analog intermediate frequency (IF) signals travel or are processed, and reference number 428 indicates a region in which analog radio frequency (RF) signals travel or are processed. The architecture also includes a local oscillator A 430, a local oscillator B 432, and a controller/processor 434. In some aspects, controller/processor 434 corresponds to controller/processor 240 of the base station described above in connection with FIG. 2 and/or controller/processor 280 of the UE described above in connection with FIG. 2.

Each of the antenna elements 420 may include one or more sub-elements for radiating or receiving RF signals. For example, a single antenna element 420 may include a first sub-element cross-polarized with a second sub-element that can be used to independently transmit cross-polarized signals. The antenna elements 420 may include patch antennas, dipole antennas, or other types of antennas arranged in a linear pattern, a two dimensional pattern, or another pattern. A spacing between antenna elements 420 may be such that signals with a desired wavelength transmitted separately by the antenna elements 420 may interact or interfere (e.g., to form a desired beam). For example, given an expected range of wavelengths or frequencies, the spacing may provide a quarter wavelength, half wavelength, or other fraction of a wavelength of spacing between neighboring antenna elements 420 to allow for interaction or interference of signals transmitted by the separate antenna elements 420 within that expected range.

The modem 402 processes and generates digital baseband signals and may also control operation of the DAC 404, first and second mixers 406, 408, splitter 410, first amplifiers 412, phase shifters 414, and/or the second amplifiers 416 to transmit signals via one or more or all of the antenna elements 420. The modem 402 may process signals and control operation in accordance with a communication standard such as a wireless standard discussed herein. The DAC 404 may convert digital baseband signals received from the modem 402 (and that are to be transmitted) into analog baseband signals. The first mixer 406 upconverts analog baseband signals to analog IF signals within an IF using a local oscillator A 430. For example, the first mixer 406 may mix the signals with an oscillating signal generated by the local oscillator A 430 to "move" the baseband analog signals to the IF. In some cases, some processing or filtering (not shown) may take place at the IF. The second mixer 408 upconverts the analog IF signals to analog RF signals using the local oscillator B 432. Similar to the first mixer, the second mixer 408 may mix the signals with an oscillating signal generated by the local oscillator B 432 to "move" the IF analog signals to the RF or the frequency at which signals will be transmitted or received. The modem 402 and/or the controller/processor 434 may adjust the frequency of local oscillator A 430 and/or the local oscillator B 432 so that a desired IF and/or RF frequency is produced and used to facilitate processing and transmission of a signal within a desired bandwidth.

In the illustrated architecture 400, signals upconverted by the second mixer 408 are split or duplicated into multiple signals by the splitter 410. The splitter 410 in architecture 400 splits the RF signal into multiple identical or nearly identical RF signals. In other examples, the split may take place with any type of signal, including with baseband digital, baseband analog, or IF analog signals. Each of these signals may correspond to an antenna element 420, and the signal travels through and is processed by amplifiers 412, 416, phase shifters 414, and/or other elements corresponding to the respective antenna element 420 to be provided to and transmitted by the corresponding antenna element 420 of the antenna array 418. In one example, the splitter 410 may be an active splitter that is connected to a power supply and provides some gain so that RF signals exiting the splitter 410 are at a power level equal to or greater than the signal entering the splitter 410. In another example, the splitter 410 is a passive splitter that is not connected to power supply and the RF signals exiting the splitter 410 may be at a power level lower than the RF signal entering the splitter 410.

After being split by the splitter 410, the resulting RF signals may enter an amplifier, such as a first amplifier 412, or a phase shifter 414 corresponding to an antenna element 420. The first and second amplifiers 412, 416 are illustrated with dashed lines because one or both of them might not be necessary in some aspects. In some aspects, both the first amplifier 412 and second amplifier 416 are present. In some aspects, neither the first amplifier 412 nor the second amplifier 416 is present. In some aspects, one of the two amplifiers 412, 416 is present but not the other. By way of example, if the splitter 410 is an active splitter, the first amplifier 412 may not be used. By way of further example, if the phase shifter 414 is an active phase shifter that can provide a gain, the second amplifier 416 might not be used.

The amplifiers 412, 416 may provide a desired level of positive or negative gain. A positive gain (positive dB) may be used to increase an amplitude of a signal for radiation by a specific antenna element 420. A negative gain (negative dB) may be used to decrease an amplitude and/or suppress radiation of the signal by a specific antenna element. Each of the amplifiers 412, 416 may be controlled independently (e.g., by the modem 402 or the controller/processor 434) to provide independent control of the gain for each antenna element 420. For example, the modem 402 and/or the controller/processor 434 may have at least one control line connected to each of the splitter 410, first amplifiers 412, phase shifters 414, and/or second amplifiers 416 that may be used to configure a gain to provide a desired amount of gain for each component and thus each antenna element 420.

The phase shifter 414 may provide a configurable phase shift or phase offset to a corresponding RF signal to be transmitted. The phase shifter 414 may be a passive phase shifter not directly connected to a power supply. Passive phase shifters might introduce some insertion loss. The second amplifier 416 may boost the signal to compensate for the insertion loss. The phase shifter 414 may be an active phase shifter connected to a power supply such that the active phase shifter provides some amount of gain or prevents insertion loss. The settings of each of the phase shifters 414 are independent, meaning that each can be independently set to provide a desired amount of phase shift or the same amount of phase shift or some other configuration. The modem 402 and/or the controller/processor 434 may have at least one control line connected to each of the phase shifters 414 and which may be used to configure the phase shifters 414 to provide a desired amount of phase shift or phase offset between antenna elements 420.

In the illustrated architecture 400, RF signals received by the antenna elements 420 are provided to one or more first amplifiers 456 to boost the signal strength. The first amplifiers 456 may be connected to the same antenna arrays 418 (e.g., for time division duplex (TDD) operations). The first amplifiers 456 may be connected to different antenna arrays 418. The boosted RF signal is input into one or more phase shifters 454 to provide a configurable phase shift or phase offset for the corresponding received RF signal to enable reception via one or more Rx beams. The phase shifter 454 may be an active phase shifter or a passive phase shifter. The settings of the phase shifters 454 are independent, meaning that each can be independently set to provide a desired amount of phase shift or the same amount of phase shift or some other configuration. The modem 402 and/or the controller/processor 434 may have at least one control line connected to each of the phase shifters 454 and which may be used to configure the phase shifters 454 to provide a desired amount of phase shift or phase offset between antenna elements 420 to enable reception via one or more Rx beams.

The outputs of the phase shifters 454 may be input to one or more second amplifiers 452 for signal amplification of the phase shifted received RF signals. The second amplifiers 452 may be individually configured to provide a configured amount of gain. The second amplifiers 452 may be individually configured to provide an amount of gain to ensure that the signals input to combiner 450 have the same magnitude. The amplifiers 452 and/or 456 are illustrated in dashed lines because they might not be necessary in some aspects. In some aspects, both the amplifier 452 and the amplifier 456 are present. In another aspect, neither the amplifier 452 nor the amplifier 456 are present. In other aspects, one of the amplifiers 452, 456 is present but not the other.

In the illustrated architecture 400, signals output by the phase shifters 454 (via the amplifiers 452 when present) are combined in combiner 450. The combiner 450 in architecture 400 combines the RF signal into a signal. The combiner 450 may be a passive combiner (e.g., not connected to a power source), which may result in some insertion loss. The combiner 450 may be an active combiner (e.g., connected to a power source), which may result in some signal gain. When combiner 450 is an active combiner, it may provide a different (e.g., configurable) amount of gain for each input signal so that the input signals have the same magnitude when they are combined. When combiner 450 is an active combiner, the combiner 450 may not need the second amplifier 452 because the active combiner may provide the signal amplification.

The output of the combiner 450 is input into mixers 448 and 446. Mixers 448 and 446 generally down convert the received RF signal using inputs from local oscillators 472 and 470, respectively, to create intermediate or baseband signals that carry the encoded and modulated information. The output of the mixers 448 and 446 are input into an analog-to-digital converter (ADC) 444 for conversion to analog signals. The analog signals output from ADC 444 is input to modem 402 for baseband processing, such as decoding, de-interleaving, or similar operations.

The architecture 400 is given by way of example only to illustrate an architecture for transmitting and/or receiving signals. In some cases, the architecture 400 and/or each portion of the architecture 400 may be repeated multiple times within an architecture to accommodate or provide an arbitrary number of RF chains, antenna elements, and/or antenna panels. Furthermore, numerous alternate architectures are possible and contemplated. For example, although only a single antenna array 418 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (e.g., represented by different ones of the reference numbers 422, 424, 426, 428) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 410, amplifiers 412, 416, or phase shifters 414 may be located between the DAC 404 and the first mixer 406 or between the first mixer 406 and the second mixer 408. In one example, the functions of one or more of the components may be combined into one component. For example, the phase shifters 414 may perform amplification to include or replace the first and/or or second amplifiers 412, 416. By way of another example, a phase shift may be implemented by the second mixer 408 to obviate the need for a separate phase shifter 414. This technique is sometimes called local oscillator (LO) phase shifting. In some aspects of this configuration, there may be multiple IF to RF mixers (e.g., for each antenna element chain) within the second mixer 408, and the local oscillator B 432 may supply different local oscillator signals (with different phase offsets) to each IF to RF mixer.

The modem 402 and/or the controller/processor 434 may control one or more of the other components 404 through 472 to select one or more antenna elements 420 and/or to form beams for transmission of one or more signals. For example, the antenna elements 420 may be individually selected or deselected for transmission of a signal (or signals) by controlling an amplitude of one or more corresponding amplifiers, such as the first amplifiers 412 and/or the second amplifiers 416. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 420, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 418) can be dynamically controlled by modifying the phase shifts or phase offsets imparted by the phase shifters 414 and amplitudes imparted by the amplifiers 412, 416 of the multiple signals relative to each other. The controller/processor 434 may be located partially or fully within one or more other components of the architecture 400. For example, the controller/processor 434 may be located within the modem 402 in some aspects.

As indicated above, FIG. 4 is provided as an example. Other examples may differ from what is described with regard to FIG. 4.

Figure 5:
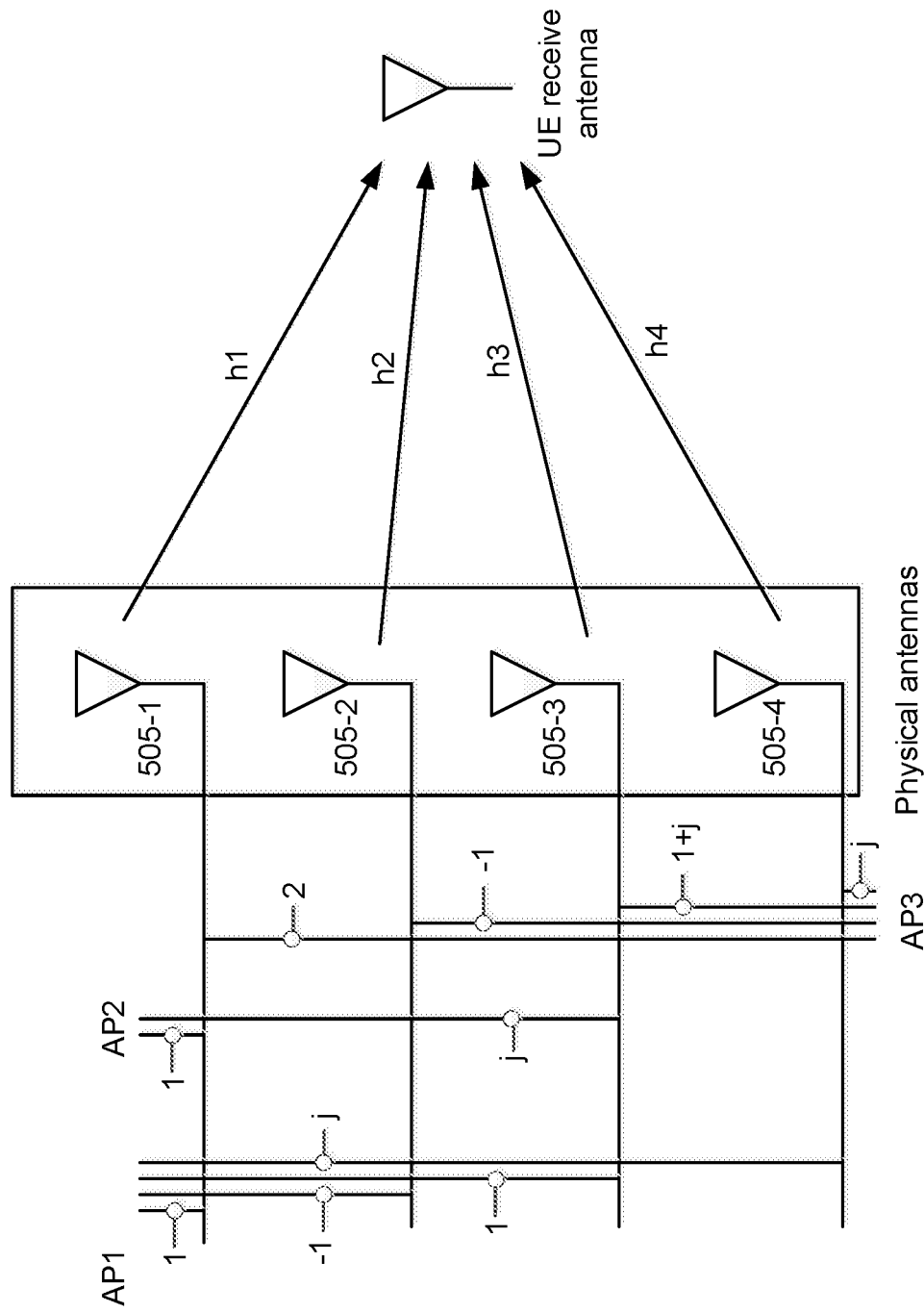
FIG. 5 is a diagram illustrating an example of antenna ports, in accordance with the present disclosure.

FIG. 5 is a diagram illustrating an example 500 of antenna ports, in accordance with the present disclosure.

As shown in FIG. 5, a first physical antenna 505-1 may transmit information via a first channel h1, a second physical antenna 505-2 may transmit information via a second channel h2, a third physical antenna 505-3 may transmit information via a third channel h3, and a fourth physical antenna 505-4 may transmit information via a fourth channel h4. Such information may be conveyed via a logical antenna port, which may represent some combination of the physical antennas and/or channels. In some cases, a UE 120 may not have knowledge of the channels associated with the physical antennas, and may only operate based on knowledge of the channels associated with antenna ports, as defined below.

An antenna port may be defined such that a channel, over which a symbol on the antenna port is conveyed, can be inferred from a channel over which another symbol on the same antenna port is conveyed. In example 500, a channel associated with antenna port 1 (AP1) is represented as h1−h2+h3+j*h4, where channel coefficients (e.g., 1, −1, 1, and j, in this case) represent weighting factors (e.g., indicating phase and/or gain) applied to each channel. Such weighting factors may be applied to the channels to improve signal power and/or signal quality at one or more receivers. Applying such weighting factors to channel transmissions may be referred to as precoding, and a precoder may refer to a specific set of weighting factors applied to a set of channels.

Similarly, a channel associated with antenna port 2 (AP2) is represented as h1+j*h3, and a channel associated with antenna port 3 (AP3) is represented as 2*h1−h2+(1+j)*h3+j*h4. In this case, antenna port 3 can be represented as the sum of antenna port 1 and antenna port 2 (e.g., AP3=AP1+

AP2) because the sum of the expression representing antenna port 1 (h1−h2+h3+j*h4) and the expression representing antenna port 2 (h1+j*h3) equals the expression representing antenna port 3 (2*h1−h2+(1+j)*h3+j*h4). It can also be said that antenna port 3 is related to antenna ports 1 and 2 [AP1,AP2] via the precoder [1,1] because 1 times the expression representing antenna port 1 plus 1 times the expression representing antenna port 2 equals the expression representing antenna port 3.

As indicated above, FIG. 5 is provided merely as an example. Other examples may differ from what is described with regard to FIG. 5.

Figure 6:
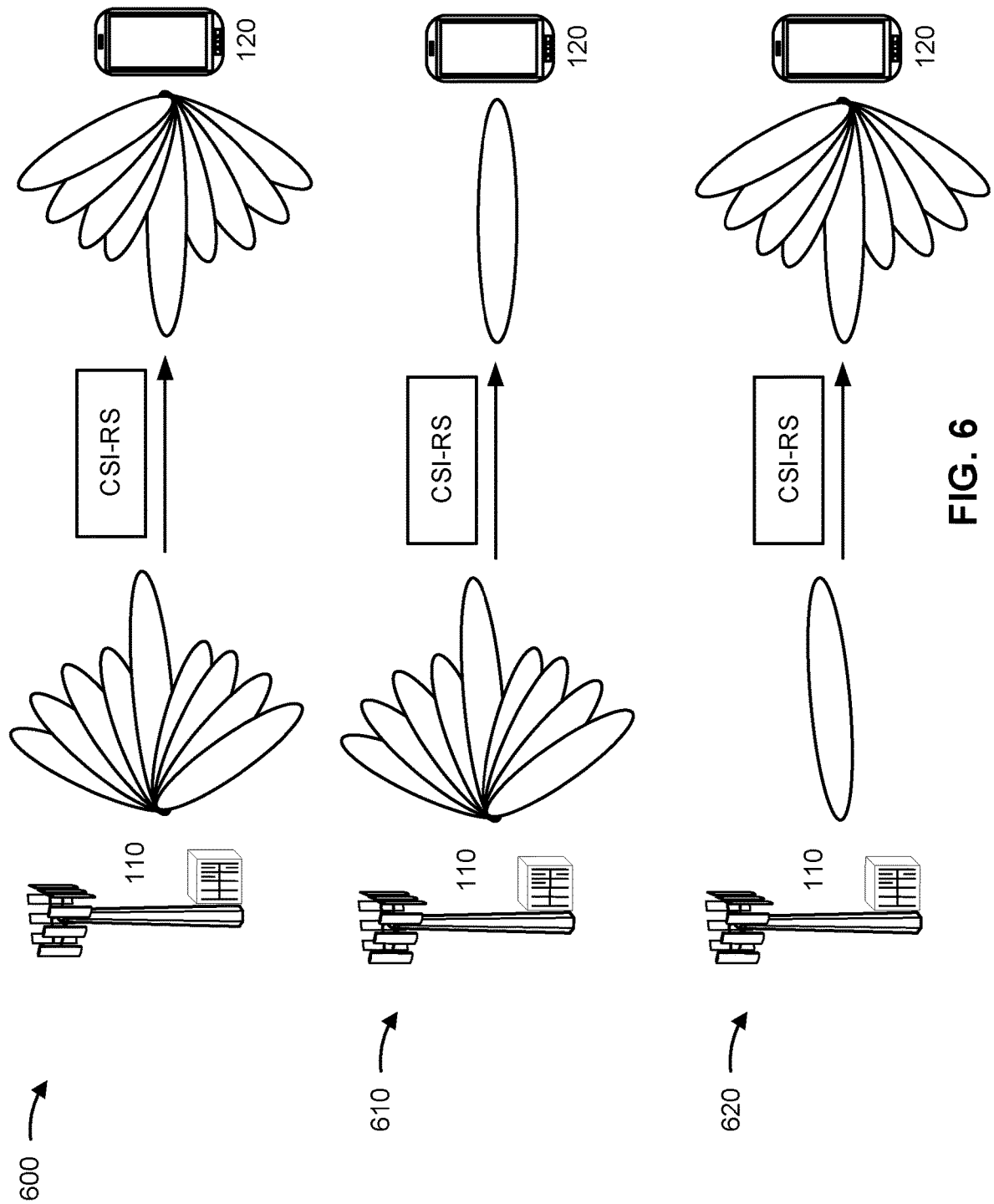
FIG. 6 is a diagram illustrating an example of beam management procedures, in accordance with the present disclosure.

FIG. 6 is a diagram illustrating examples 600, 610, and 620 of CSI-RS beam management procedures, in accordance with the present disclosure. As shown in FIG. 6, examples 600, 610, and 620 include a UE 120 in communication with a base station 110 in a wireless network (e.g., wireless network 100). However, the devices shown in FIG. 6 are provided as examples, and the wireless network may support communication and beam management between other devices (e.g., between a UE 120 and a base station 110 or transmission reception point (TRP), between a mobile termination node and a control node, between an integrated access and backhaul (IAB) child node and an IAB parent node, and/or between a scheduled node and a scheduling node). In some aspects, the UE 120 and the base station 110 may be in a connected state (e.g., a radio resource control (RRC) connected state).

As shown in FIG. 6, example 600 may include a base station 110 and a UE 120 communicating to perform beam management using CSI-RSs. Example 600 depicts a first beam management procedure (e.g., P1 CSI-RS beam management). The first beam management procedure may be referred to as a beam selection procedure, an initial beam acquisition procedure, a beam sweeping procedure, a cell search procedure, and/or a beam search procedure. As shown in FIG. 6 and example 600, CSI-RSs may be configured to be transmitted from the base station 110 to the UE 120. The CSI-RSs may be configured to be periodic (e.g., using RRC signaling), semi-persistent (e.g., using media access control (MAC) control element (MAC-CE) signaling), and/or aperiodic (e.g., using DCI).

The first beam management procedure may include the base station 110 performing beam sweeping over multiple transmit (Tx) beams. The base station 110 may transmit a CSI-RS using each transmit beam for beam management. To enable the UE 120 to perform receive (Rx) beam sweeping, the base station may use a transmit beam to transmit (e.g., with repetitions) each CSI-RS at multiple times within the same RS resource set so that the UE 120 can sweep through receive beams in multiple transmission instances. For example, if the base station 110 has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the base station 110, the UE 120 may perform beam sweeping through the receive beams of the UE 120. As a result, the first beam management procedure may enable the UE 120 to measure a CSI-RS on different transmit beams using different receive beams to support selection of base station 110 transmit beams/UE 120 receive beam(s) beam pair(s). The UE 120 may report the measurements to the base station 110 to enable the base station 110 to select one or more beam pair(s) for communication between the base station 110 and the UE 120. While example 600 has been described in connection with CSI-RSs, the first beam management process may also use SSBs for beam management in a similar manner as described above.

As shown in FIG. 6, example 610 may include a base station 110 and a UE 120 communicating to perform beam management using CSI-RSs. Example 610 depicts a second beam management procedure (e.g., P2 CSI-RS beam management). The second beam management procedure may be referred to as a beam refinement procedure, a base station beam refinement procedure, a TRP beam refinement procedure, and/or a transmit beam refinement procedure. As shown in FIG. 6 and example 610, CSI-RSs may be configured to be transmitted from the base station 110 to the UE 120. The CSI-RSs may be configured to be aperiodic (e.g., using DCI). The second beam management procedure may include the base station 110 performing beam sweeping over one or more transmit beams. The one or more transmit beams may be a subset of all transmit beams associated with the base station 110 (e.g., determined based at least in part on measurements reported by the UE 120 in connection with the first beam management procedure). The base station 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the first beam management procedure). The second beam management procedure may enable the base station 110 to select a best transmit beam based at least in part on measurements of the CSI-RSs (e.g., measured by the UE 120 using the single receive beam) reported by the UE 120.

As shown in FIG. 6, example 620 depicts a third beam management procedure (e.g., P3 CSI-RS beam management). The third beam management procedure may be referred to as a beam refinement procedure, a UE beam refinement procedure, and/or a receive beam refinement procedure. As shown in FIG. 6 and example 620, one or more CSI-RSs may be configured to be transmitted from the base station 110 to the UE 120. The CSI-RSs may be configured to be aperiodic (e.g., using DCI). The third beam management process may include the base station 110 transmitting the one or more CSI-RSs using a single transmit beam (e.g., determined based at least in part on measurements reported by the UE 120 in connection with the first beam management procedure and/or the second beam management procedure). To enable the UE 120 to perform receive beam sweeping, the base station may use a transmit beam to transmit (e.g., with repetitions) CSI-RS at multiple times within the same RS resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the base station 110 and/or the UE 120 to select a best receive beam based at least in part on reported measurements received from the UE 120 (e.g., of the CSI-RS of the transmit beam using the one or more receive beams).

As indicated above, FIG. 6 is provided as an example of beam management procedures. Other examples of beam management procedures may differ from what is described with respect to FIG. 6. For example, the UE 120 and the base station 110 may perform the third beam management procedure before performing the second beam management procedure, and/or the UE 120 and the base station 110 may perform a similar beam management procedure to select a UE transmit beam.

As described herein, a UE and base station may use reference signals to enable channel estimation, which may facilitate selection of beam weights (e.g., via a transmitted precoding matrix indicator (TPMI)) for communications between the UE and the base station. A static codebook approach may enable the base station to provide the UE with an indication of beam weights to be used for uplink and/or downlink communications. The static codebook is limited to a particular size, based on both the amount of storage used to store the static codebook and based on the number of bits required for the base station to identify a particular codebook configuration. Therefore, the static codebook approach covers a limited range of potential beam weights, which might not be an optimal set of beam weights for uplink and/or downlink communications. In addition, the UE does not determine the beam weights using the static codebook approach, but is instructed by the base station which beam weights to use.

Some techniques and apparatuses described herein provide a UE with the ability to communicate using dynamically selected beam weights. For example, the UE may switch between a static codebook approach and a dynamic beam weight selection approach in situations where the UE may take advantage of beam weights that might be better suited for communications than pre-configured static codebook beam weights. In addition, the UE may be able to switch between different dynamic beam weight selection techniques based on various circumstances specific to the UE. As a result, the UE may be able to transmit communications with beam weights determined dynamically, which may improve the quality of the communications (e.g., with respect to noise, bandwidth, and/or the like), and reduce the likelihood of poor quality communications with the base station. Improving the quality of network communications may conserve processing and networking resources, of both UEs and base stations, which might otherwise be used to re-transmit communications that are of lower quality.

Figure 7:
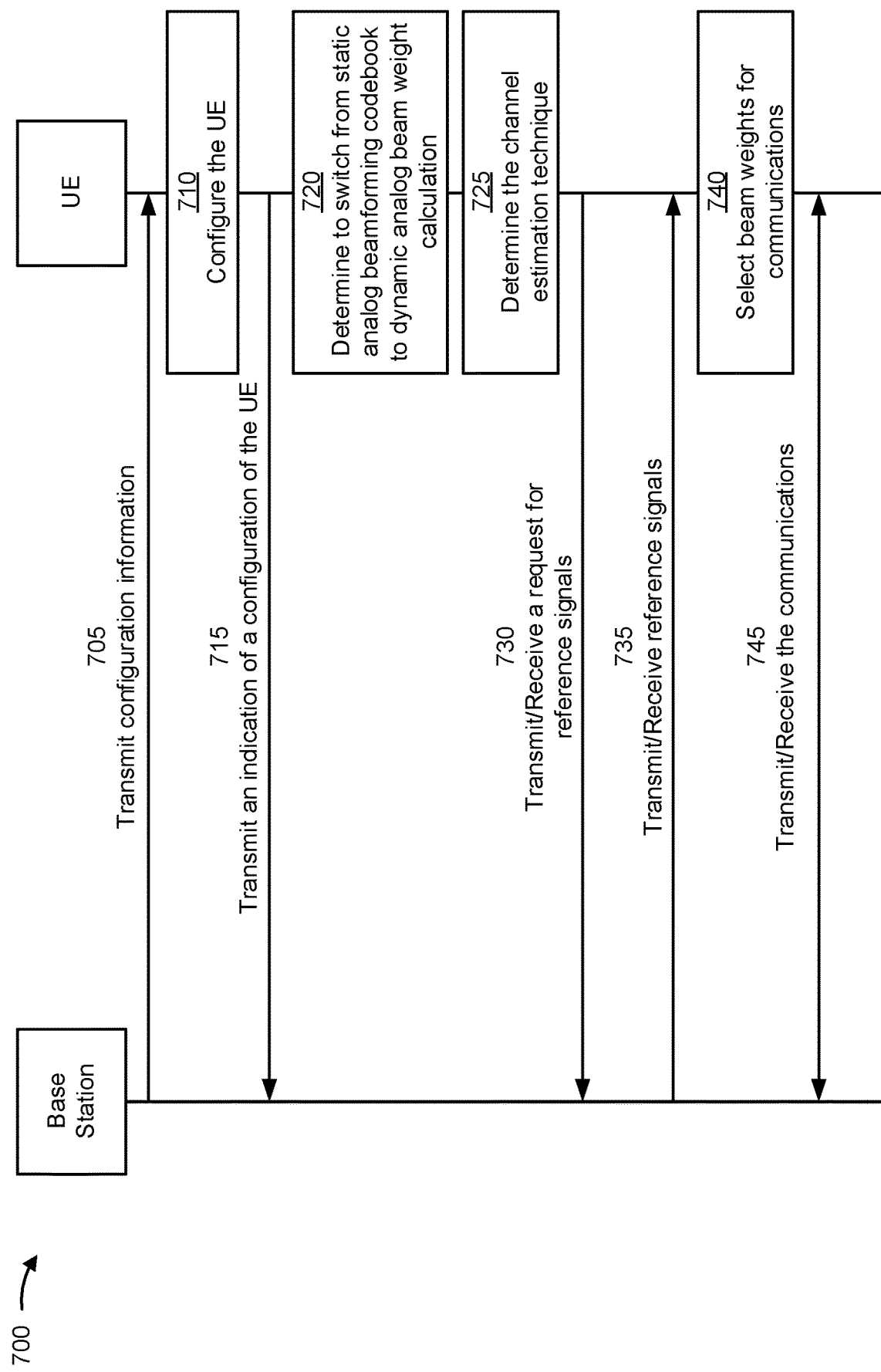
FIG. 7 is a diagram illustrating an example associated with communications using dynamic beam weights, in accordance with the present disclosure.

FIG. 7 is a diagram illustrating an example 700 of communications using dynamic beam weights, in accordance with the present disclosure. As shown in FIG. 7, a UE (e.g., UE 120) may communicate (e.g., transmit an uplink transmission and/or receive a downlink transmission) with a base station (e.g., base station 110). In some aspects, the UE may communicate with another UE via one or more sidelink communications (e.g., in addition to, or in place of, communicating with the base station). The UE and the base station may be part of a wireless network (e.g., wireless network 100).

As shown by reference number 705, the base station may transmit, and the UE may receive, configuration information. In some aspects, the UE may receive configuration information from another device (e.g., from another base station or another UE). In some aspects, the UE may receive the configuration information via RRC signaling and/or medium access control (MAC) signaling (e.g., MAC control elements (MAC CEs)). In some aspects, the configuration information may include an indication of one or more configuration parameters (e.g., already known to the UE) for selection by the UE and/or explicit configuration information for the UE to use to configure the UE.

In some aspects, the configuration information may indicate that the UE is to selectively switch between a static codebook technique to a dynamic beam weight calculation technique for communications with the base station. For example, the UE may be configured to switch between a static codebook to a dynamic beam weight calculation based on one or more conditions being met. The dynamic beam weights may be calculated based at least in part on a channel estimation technique, and the UE may determine the channel estimation technique based on various factors. In some aspects, the configuration information may indicate that the base station may provide, upon request, reference signals for the UE to use in determining the beam weights.

As shown by reference number 710, the UE may configure the UE for communicating with the base station. In some aspects, the UE may configure the UE based at least in part on the configuration information. In some aspects, the UE may be configured to perform one or more operations described herein.

As shown by reference number 715, the UE may transmit, and the base station may receive, an indication of a configuration of the UE to communicate (e.g., one or more of uplink transmissions or downlink transmissions) using dynamic beam weights. For example, the UE may indicate a capability of the UE to switch between a static codebook approach for uplink and/or downlink transmissions to a dynamic beam weight calculation technique. In some aspects, the UE may transmit the indication via RRC signaling, one or more MAC CEs, and/or a physical uplink control channel (PUCCH) message, among other examples.

As shown by reference number 720, the UE may determine, based at least in part on at least one of multiple conditions being met, to switch from a static analog beamforming codebook to a dynamic analog beam weight calculation for selecting beam weights for communications between the UE and the base station. For example, the UE may be in communication with the base station for transmission of data and/or control information using a static codebook to determine beam weights for transmitting uplink communications and receiving downlink communications (e.g., the static codebook may have been used to determine beam weights for transmission of the indication associated with reference number 715). When a condition, or set of conditions, is satisfied, the UE may switch from using the static codebook to a dynamic beam weight calculation for the communications with the base station.

In some aspects, the condition, or conditions, may include at least one of the following: a UE signal blockage condition (e.g., a body part or other physical object physically blocking at least a portion of signal transmitted via one or more of the antennas of the UE), a performance requirement condition associated with the UE (e.g., in a situation where using the static codebook does not meet a threshold performance metric, such as data rate, signal to interference and noise ratio (SINR), received signal strength indicator (RSSI) reported by the base station, and/or the like), a channel environment condition (e.g., availability of multiple clusters corresponding to distinct propagation paths associated with the channel between the transmitter and receiver, a threshold angular spread associated with the clusters, and/or the like), or some combination thereof. For example, the UE may determine whether a condition or multiple conditions have been met based on various measurements and/or feedback from the base station and/or other nodes of the network, including signal quality measurements (e.g., RSSI, SINR, and/or the like) associated with one or more antennas of the UE.

As shown by reference number 725, the UE may determine the channel estimation technique based at least in part on one or more factors relevant to channel estimation. For example, there may be multiple channel estimation techniques that may be used to determine and select beam weights for an uplink or downlink communication. For a channel estimation technique, $H_{ij}(k)$ may denote an N×M channel matrix between the jth polarization at the base station side, and the ith polarization at the UE side, over the kth subcarrier (where i,j=0,1 for dual-polarized systems). N may denote the number of antennas at the UE side, while M may denote the number of antennas at the base station side. Due to polarization mixing over reference signals (e.g., SSBs, CSI-RSs, and/or the like), for the ith polarization at the UE side, and the kth subcarrier, the following equation represents the estimation of (k):

$$h_i(k)=H_{i0}(k)f_0+H_{i1}(k)f_1$$

where $f_0$ and $f_1$ denote the base station side beams used over the 0th and 1st polarization.

In some aspects, the channel estimation technique may include an instantaneous channel estimation technique. The instantaneous channel estimation technique may assume that $h_i(k)$ is dominated over some subcarrier k*, estimate $h_i(k)$, and use $h_i(k)$ over all subcarriers. The chosen subcarrier may be selected using any method, including a random selection method. Using the instantaneous channel estimation technique to estimate the channel using one subcarrier, the number of reference signals needed to perform the estimation may scale linearly with the number of UE antennas, N. In some aspects, the estimation of $h_i(k^*)$ may take 3N−2 reference signals (e.g., SSBs or CSI-RSs).

In some aspects, the channel estimation technique may include a statistics-based channel estimation technique. The statistics-based channel estimation technique may include an estimation of a covariance matrix of $h_i(k)$ and use the covariance matrix for all subcarriers. In this situation, beamforming may be based on the dominant eigenvector of the covariance matrix, and estimation of the beamforming vector may take $N^2$ reference signals (e.g., SSBs or CSI-RSs). Other variations may be used, though the statistics-based channel estimation technique generally scales quadratically with the number of antennas, N.

Given the different channel estimation techniques, the UE may determine which technique to use based at least in part on a variety of factors. For example, the factors may include: an amount of available computational power of the UE, dimensions of an antenna array used by the UE, a type of reference signal used for channel estimation (e.g., SSB or CSI-RS), a number of reference signals used for channel estimation, a speed associated with the UE (e.g., a velocity), a latency requirement of an application associated with the UE, a signal quality requirement associated with the UE, or some combination thereof. For example, the statistics-based channel estimation technique may typically lead to better 2-layer signal to noise ratio (SNR) gain than the instantaneous channel estimation technique, though the statistics-based channel estimation technique may use more network resources (e.g., more reference signals required and quadratic scaling) and/or processing resources (e.g., more computational overhead associated with Eigenvector computation and quadratic scaling).

As described herein, the channel estimation technique may use one or more reference signals to generate one or more channel matrices (e.g., including one or more channel covariance matrices). In some aspects, the number of reference signals scales linearly with the number of antennas of the UE. For example, in a situation where the UE uses a 4×1 dual-polarized antenna array and requires 3N−2 reference signals for the instantaneous channel estimation technique, the UE may request 10 reference signals (e.g., 10=3(4)−2).

In some aspects, the number of reference signals scales quadratically with the number of antennas of the UE. For example, in a situation where the UE uses the 4×1 dual-polarized antenna array and requires $N^2$ reference signals for the statistics-based channel estimation technique, the UE may request 16 reference signals (e.g., $16=4^2$). In some aspects, the beam weights may be associated with phase shifter quantization, amplitude control quantization, or some combination thereof. For example, a combination of phase shifter quantization and amplitude control quantization may result in higher gain relative to phase shifter only quantization.

As shown by reference number 730, the UE may transmit, and the base station may receive, a request for a number of reference signals. As described herein, the UE may request a number of reference signals that is based at least in part on the channel estimation technique. The reference signals may include SSBs, CSI-RSs, and/or the like. In some aspects, the request may be associated with a short burst of multiple reference signals (e.g., associated with the instantaneous channel estimation technique). In some aspects, the request may be associated with a long burst of multiple reference signals (e.g., associated with the statistics-based channel estimation technique).

As shown by reference number 735, the base station may transmit, and the UE may receive, the reference signals associated with the request. For example, as described herein, the base station may transmit a short burst of reference signals or a long burst of reference signals, based at least in part on the request. In some aspects, the base station may transmit multiple reference signals (e.g., each of the requested reference signals) via the same antenna port of the base station.

As shown by reference number 740, the UE may select the beam weights for the communications using the dynamic beam weight calculation. As described herein, the selection of the beam weights may include generating one or more channel matrices using a channel estimation technique (e.g., the instantaneous channel estimation technique or generating one or more channel covariance matrices using the statistics-based channel estimation technique) and selecting the beam weights from one of the matrices. For example, the UE may use the channel estimation technique to generate a channel matrix for each of the reference signals requested/received by the UE.

As shown by reference number 745, the UE may transmit, and the base station may receive, the uplink communication. The uplink communication may be transmitted using the beam weights selected using the dynamic beam weight calculation.

While the example 700 describes switching from a static analog beamforming codebook weight approach to selecting beam weights to a dynamic analog beam weight calculation, in some aspects, the UE may switch from one dynamic analog beam weight calculation technique to another. For example, the UE may switch from the instantaneous channel estimation technique to the statistics-based channel estimation technique, or from the statistics-based channel estimation technique to the instantaneous channel estimation technique. In this situation, the UE may determine which channel estimation technique to use in a manner similar to that described herein (e.g., with reference to reference number 725). For example, the UE and/or base station may repeat the actions associated with reference numbers 725, 730, 735, and 740 to switch between channel estimation techniques.

As indicated above, FIG. 7 is provided as an example. Other examples may differ from what is described with regard to FIG. 7.

Figure 8:
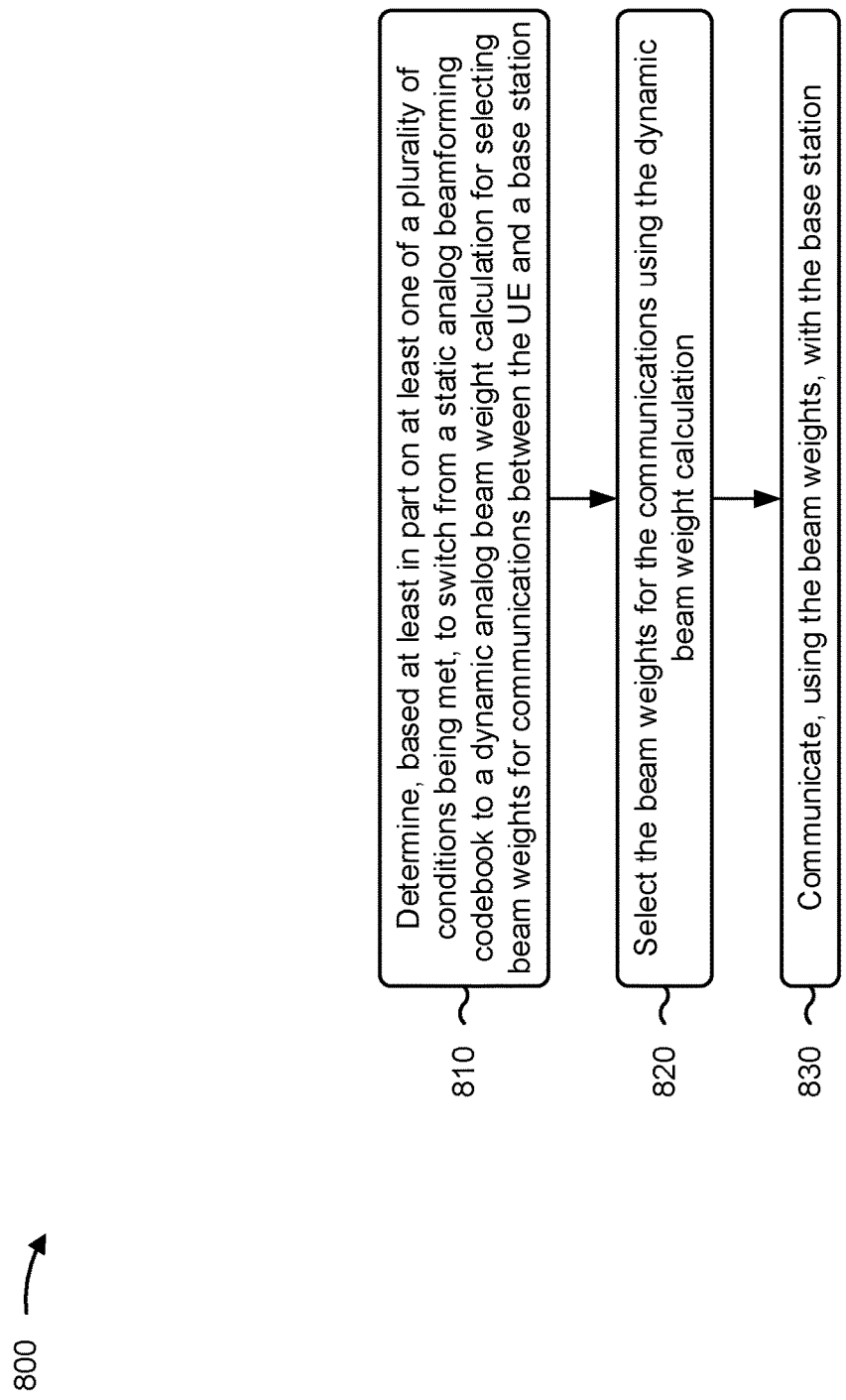
FIGS. 8 and 9 are diagrams illustrating example processes associated with communications using dynamic beam weights, in accordance with the present disclosure.

FIG. 8 is a diagram illustrating an example process 800 performed, for example, by a UE, in accordance with the present disclosure. Example process 800 is an example where the UE (e.g., UE120) performs operations associated with communications using dynamic beam weights.

As shown in FIG. 8, in some aspects, process 800 may include determining, based at least in part on at least one of a plurality of conditions being met, to switch from a static analog beamforming codebook to a dynamic analog beamforming beam weight calculation for selecting beam weights for communications between the UE and a base station (block 810). For example, the UE (e.g., using communication manager 140 and/or determination component 1008, depicted in FIG. 10) may determine, based at least in part on at least one of a plurality of conditions being met, to switch from a static analog beamforming codebook to a dynamic analog beamforming beam weight calculation for selecting beam weights for communications between the UE and a base station, as described above.

As further shown in FIG. 8, in some aspects, process 800 may include selecting the beam weights for the communications using the dynamic beam weight calculation (block 820). For example, the UE (e.g., using communication manager 140 and/or selection component 1010, depicted in FIG. 10) may select the beam weights for the communications using the dynamic beam weight calculation, as described above.

As further shown in FIG. 8, in some aspects, process 800 may include communicating, using the beam weights, with the base station (block 830). For example, the UE (e.g., using communication manager 140, transmission component 1004, and/or reception component 1002, depicted in FIG. 10) may communicate, using the beam weights, with the base station, as described above.

Process 800 may include additional aspects, such as any single aspect or any combination of aspects described below and/or in connection with one or more other processes described elsewhere herein.

In a first aspect, the plurality of conditions comprises a UE signal blockage condition, a performance requirement condition associated with the UE, a channel environment condition, or some combination thereof.

In a second aspect, alone or in combination with the first aspect, the beam weights are associated with at least phase shifter quantization, amplitude control quantization, or some combination thereof.

In a third aspect, alone or in combination with one or more of the first and second aspects, selecting the beam weights comprises generating one or more channel matrices or one or more channel covariance matrices using a channel estimation technique, and selecting the beam weights using a channel matrix of the one or more channel matrices or the one or more channel covariance matrices.

In a fourth aspect, alone or in combination with one or more of the first through third aspects, process 800 includes determining the channel estimation technique from a plurality of channel estimation techniques based at least in part on at least an amount of available computational power of the UE, dimensions of an antenna array used by the UE, a type of reference signal used for channel estimation, a number of reference signals used for channel estimation, a speed associated with the UE, a latency requirement of an application associated with the UE, a signal quality requirement associated with the UE, or some combination thereof.

In a fifth aspect, alone or in combination with one or more of the first through fourth aspects, generating the one or more channel matrices using the channel estimation technique comprises requesting a number of reference signals from the base station, and for each of the reference signals, using the channel estimation technique to generate one of the one or more channel matrices.

In a sixth aspect, alone or in combination with one or more of the first through fifth aspects, the channel estimation technique comprises one of an instantaneous channel estimation technique, or a statistics-based channel estimation technique.

In a seventh aspect, alone or in combination with one or more of the first through sixth aspects, the instantaneous channel estimation technique uses a number of reference signals that scales linearly with a number of antennas of the UE.

In an eighth aspect, alone or in combination with one or more of the first through seventh aspects, the statistics-based channel estimation technique uses a number of reference signals that scales quadratically with a number of antennas of the UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
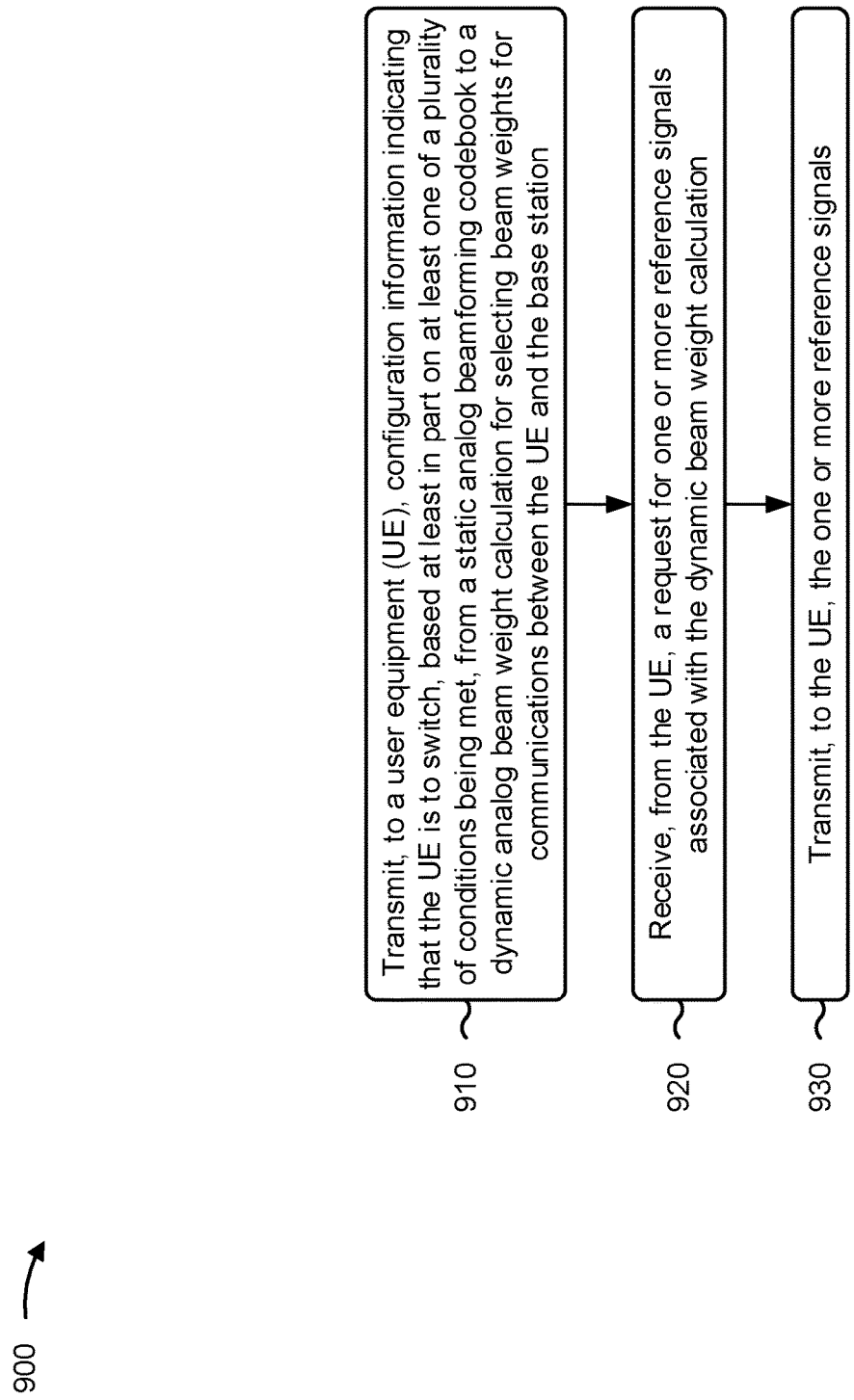

FIG. 9 is a diagram illustrating an example process 900 performed, for example, by a base station, in accordance with the present disclosure. Example process 900 is an example where the base station (e.g., base station 110) performs operations associated with communications using dynamic beam weights.

As shown in FIG. 9, in some aspects, process 900 may include transmitting, to a user equipment (UE), configuration information indicating that the UE is to switch, based at least in part on at least one of a plurality of conditions being met, from a static analog beamforming codebook to a dynamic analog beam weight calculation for selecting beam weights for communications between the UE and the base station (block 910). For example, the base station (e.g., using communication manager 150 and/or transmission component 1104, depicted in FIG. 11) may transmit, to a user equipment (UE), configuration information indicating that the UE is to switch, based at least in part on at least one of a plurality of conditions being met, from a static analog beamforming codebook to a dynamic analog beam weight calculation for selecting beam weights for communications between the UE and the base station, as described above.

As further shown in FIG. 9, in some aspects, process 900 may include receiving, from the UE, a request for one or more reference signals associated with the dynamic beam weight calculation (block 920). For example, the base station (e.g., using communication manager 150 and/or reception component 1102, depicted in FIG. 11) may receive, from the UE, a request for one or more reference signals associated with the dynamic beam weight calculation, as described above.

As further shown in FIG. 9, in some aspects, process 900 may include transmitting, to the UE, the one or more reference signals (block 930). For example, the base station (e.g., using communication manager 150 and/or transmission component 1104, depicted in FIG. 11) may transmit, to the UE, the one or more reference signals, as described above.

Process 900 may include additional aspects, such as any single aspect or any combination of aspects described below and/or in connection with one or more other processes described elsewhere herein.

In a first aspect, the plurality of conditions comprises a UE signal blockage condition, a performance requirement condition associated with the UE, a channel environment condition, or some combination thereof.

In a second aspect, alone or in combination with the first aspect, the request is associated with a short burst of multiple reference signals.

In a third aspect, alone or in combination with one or more of the first and second aspects, the request is associated with a long burst of multiple reference signals.

In a fourth aspect, alone or in combination with one or more of the first through third aspects, the one or more reference signals include a plurality of reference signals transmitted via a same antenna port of the base station.

In a fifth aspect, alone or in combination with one or more of the first through fourth aspects, process 900 includes receiving, by the base station and based at least in part on the one or more reference signals, an uplink communication from the UE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
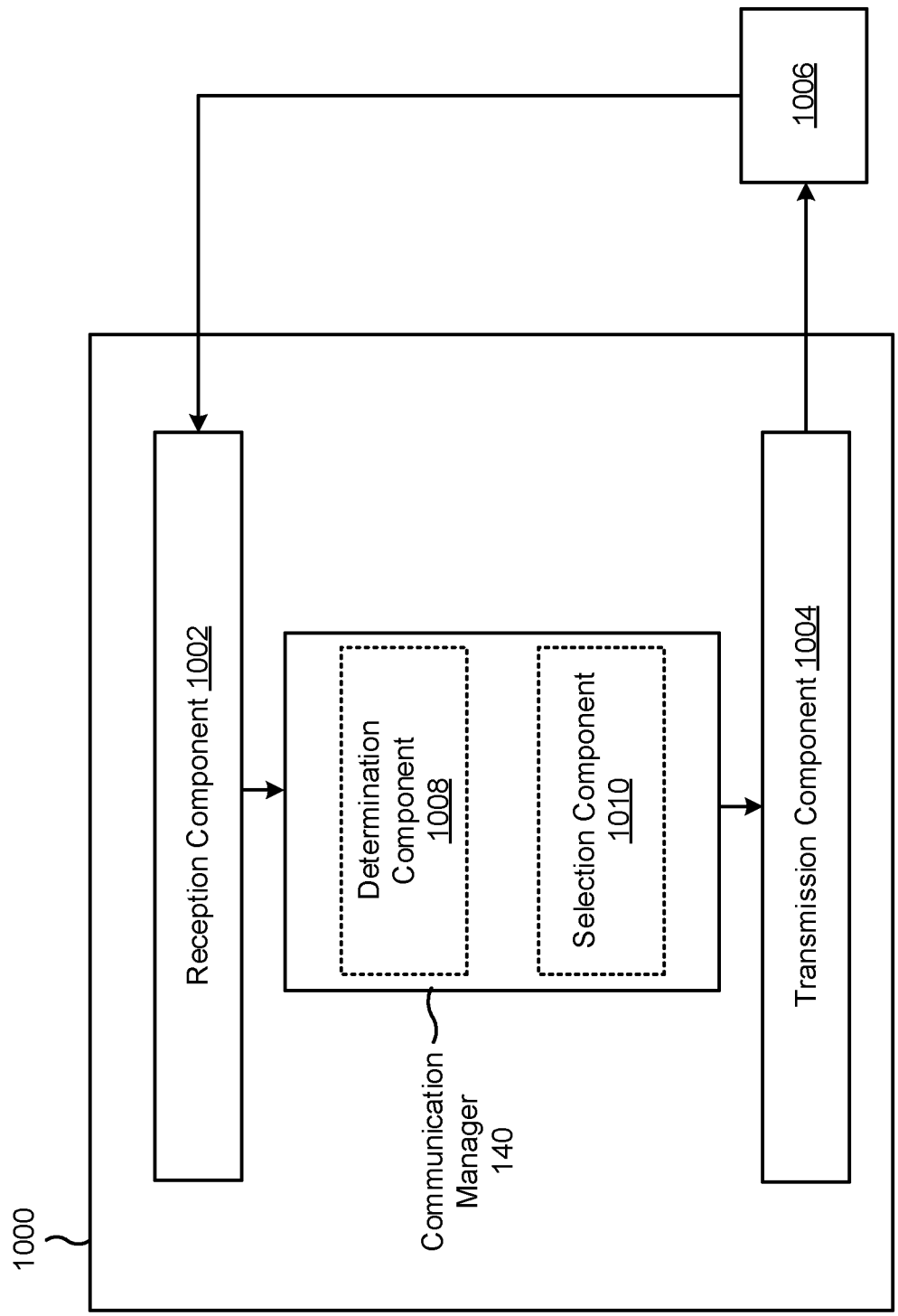
FIGS. 10 and 11 are diagrams of example apparatuses for wireless communication, in accordance with the present disclosure.

FIG. 10 is a diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include one or more of a determination component 1008, or a selection component 1010, among other examples.

In some aspects, the apparatus 1000 may be configured to perform one or more operations described herein in connection with FIGS. 6-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The determination component 1008 may determine, based at least in part on at least one of a plurality of conditions being met, to switch from a static analog beamforming codebook to a dynamic analog beamforming beam weight calculation for selecting beam weights for communications between the UE and a base station. The selection component 1010 may select the beam weights for the communications using the dynamic beam weight calculation. The reception component 1002 and/or the transmission component 1004 may communicate, using the beam weights, with the base station.

The determination component 1008 may determine the channel estimation technique from a plurality of channel estimation techniques based at least in part on at least an amount of available computational power of the UE, dimensions of an antenna array used by the UE, a type of reference signal used for channel estimation, a number of reference signals used for channel estimation, a speed associated with the UE, a latency requirement of an application associated with the UE, a signal quality requirement associated with the UE, or some combination thereof.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
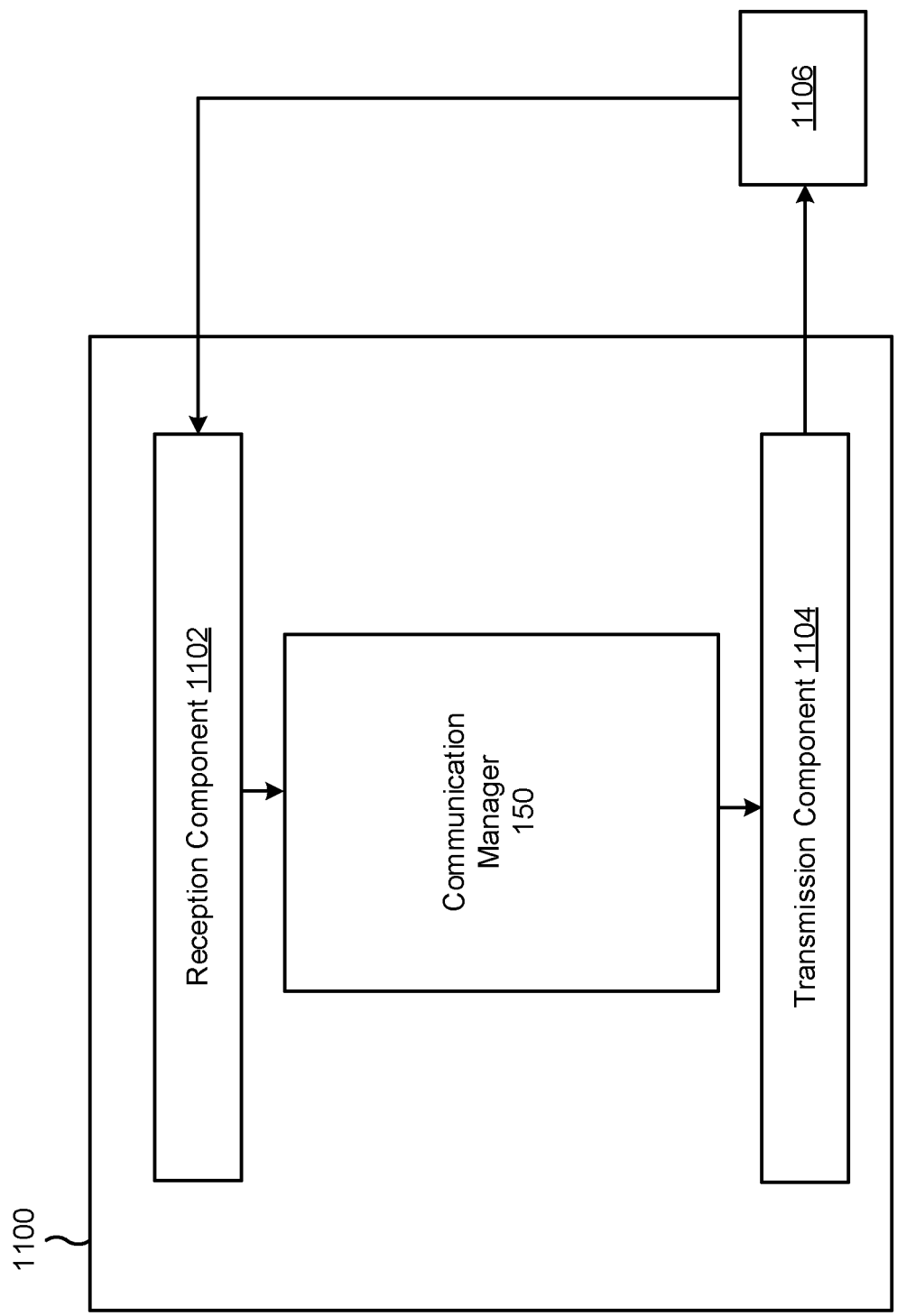

FIG. 11 is a diagram of an example apparatus 1100 for wireless communication. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 150.

In some aspects, the apparatus 1100 may be configured to perform one or more operations described herein in connection with FIGS. 6-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the base station described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the base station described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the base station described in connection with FIG. 2. In some aspects, the transmission component 1104 may be co-located with the reception component 1102 in a transceiver.

The transmission component 1104 may transmit, to a user equipment (UE), configuration information indicating that the UE is to switch, based at least in part on at least one of a plurality of conditions being met, from a static analog beamforming codebook to a dynamic analog beam weight calculation for selecting beam weights for communications between the UE and the base station. The reception component 1102 may receive, from the UE, a request for one or more reference signals associated with the dynamic beam weight calculation. The transmission component 1104 may transmit, to the UE, the one or more reference signals.

The reception component 1102 may receive, based at least in part on the one or more reference signals, an uplink communication from the UE.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a UE, comprising: determining, based at least in part on at least one of a plurality of conditions being met, to switch from a static analog beamforming codebook to a dynamic analog beam weight calculation for selecting beam weights for communications between the UE and a base station; and selecting the beam weights for the communications using the dynamic beam weight calculation; and communicating, using the beam weights, with the base station.

Aspect 2: The method of Aspect 1, wherein the plurality of conditions comprises: a UE signal blockage condition, a performance requirement condition associated with the UE, a channel environment condition, or some combination thereof.

Aspect 3: The method of any of Aspects 1-2, wherein the beam weights are associated with at least: phase shifter quantization, amplitude control quantization, or some combination thereof.

Aspect 4: The method of any of Aspects 1-3, wherein selecting the beam weights comprises: generating one or more channel matrices or one or more channel covariance matrices using a channel estimation technique; and selecting the beam weights using a channel matrix of the one or more channel matrices or the one or more channel covariance matrices.

Aspect 5: The method of Aspect 4, further comprising: determining the channel estimation technique from a plurality of channel estimation techniques based at least in part on at least: an amount of available computational power of the UE, dimensions of an antenna array used by the UE, a type of reference signal used for channel estimation, a number of reference signals used for channel estimation, a speed associated with the UE, a latency requirement of an application associated with the UE, a signal quality requirement associated with the UE, or some combination thereof.

Aspect 6: The method of any of Aspects 4-5, wherein generating the one or more channel matrices using the channel estimation technique comprises: requesting a number of reference signals from the base station; and for each of the reference signals, using the channel estimation technique to generate one of the one or more channel matrices.

Aspect 7: The method of any of Aspects 4-6, wherein the channel estimation technique comprises one of: an instantaneous channel estimation technique, or a statistics-based channel estimation technique.

Aspect 8: The method of Aspect 7, wherein the instantaneous channel estimation technique uses a number of reference signals that scales linearly with a number of antennas of the UE.

Aspect 9: The method of Aspect 7, wherein the statistics-based channel estimation technique uses a number of reference signals that scales quadratically with a number of antennas of the UE.

Aspect 10: A method of wireless communication performed by a base station, comprising: transmitting, to a UE, configuration information indicating that the UE is to switch, based at least in part on at least one of a plurality of conditions being met, from a static analog beamforming codebook to a dynamic analog beam weight calculation for selecting beam weights for communications between the UE and the base station; receiving, from the UE, a request for one or more reference signals associated with the dynamic beam weight calculation; and transmitting, to the UE, the one or more reference signals.

Aspect 11: The method of Aspect 10, wherein the plurality of conditions comprises: a UE signal blockage condition, a performance requirement condition associated with the UE, a channel environment condition, or some combination thereof.

Aspect 12: The method of any of Aspects 10-11, wherein the request is associated with a short burst of multiple reference signals.

Aspect 13: The method of any of Aspects 10-11, wherein the request is associated with a long burst of multiple reference signals.

Aspect 14: The method of any of Aspects 10-13, wherein the one or more reference signals include a plurality of reference signals transmitted via a same antenna port of the base station.

Aspect 15: The method of any of Aspects 10-14, further comprising: receiving, by the base station and based at least in part on the one or more reference signals, an uplink communication from the UE.

Aspect 16: An apparatus for wireless communication at a device, comprising a processor; memory coupled with the processor; and instructions stored in the memory and executable by the processor to cause the apparatus to perform the method of one or more of Aspects 1-9.

Aspect 16: An apparatus for wireless communication at a device, comprising a processor; memory coupled with the processor; and instructions stored in the memory and executable by the processor to cause the apparatus to perform the method of one or more of Aspects 10-15.

Aspect 17: A device for wireless communication, comprising a memory and one or more processors coupled to the memory, the one or more processors configured to perform the method of one or more of Aspects 1-9.

Aspect 17: A device for wireless communication, comprising a memory and one or more processors coupled to the memory, the one or more processors configured to perform the method of one or more of Aspects 10-15.

Aspect 18: An apparatus for wireless communication, comprising at least one means for performing the method of one or more of Aspects 1-9.

Aspect 18: An apparatus for wireless communication, comprising at least one means for performing the method of one or more of Aspects 10-15.

Aspect 19: A non-transitory computer-readable medium storing code for wireless communication, the code comprising instructions executable by a processor to perform the method of one or more of Aspects 1-9.

Aspect 19: A non-transitory computer-readable medium storing code for wireless communication, the code comprising instructions executable by a processor to perform the method of one or more of Aspects 10-15.

Aspect 20: A non-transitory computer-readable medium storing a set of instructions for wireless communication, the set of instructions comprising one or more instructions that, when executed by one or more processors of a device, cause the device to perform the method of one or more of Aspects 1-9.

Aspect 20: A non-transitory computer-readable medium storing a set of instructions for wireless communication, the set of instructions comprising one or more instructions that, when executed by one or more processors of a device, cause the device to perform the method of one or more of Aspects 10-15.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors, coupled to the memory, configured to:
determine, based at least in part on at least one of a plurality of conditions being met, to switch from using a static analog beamforming codebook to using a dynamic analog beam weight calculation for selecting beam weights for communications between the UE and a network entity;
select the beam weights for the communications using the dynamic analog beam weight calculation; and
communicate, using the beam weights, with the network entity.

2. The UE of claim 1, wherein the plurality of conditions comprises:
a UE signal blockage condition,
a performance requirement condition associated with the UE,
a channel environment condition, or
some combination thereof.

3. The UE of claim 1, wherein the beam weights are associated with at least:
phase shifter quantization,
amplitude control quantization, or
some combination thereof.

4. The UE of claim 1, wherein the one or more processors, to select the beam weights, are configured to:
generate one or more channel matrices or one or more channel covariance matrices using a channel estimation technique; and
select the beam weights using a channel matrix of the one or more channel matrices or the one or more channel covariance matrices.

5. The UE of claim 4, wherein the one or more processors are further configured to:
determine the channel estimation technique from a plurality of channel estimation techniques based at least in part on at least:
an amount of available computational power of the UE,
dimensions of an antenna array used by the UE,
a type of reference signal used for channel estimation,
a number of reference signals used for channel estimation,
a speed associated with the UE,
a latency requirement of an application associated with the UE,
a signal quality requirement associated with the UE, or
some combination thereof.

6. The UE of claim 4, wherein the one or more processors, to generate the one or more channel matrices using the channel estimation technique, are configured to:
request a number of reference signals from the network entity; and
for each of the reference signals, use the channel estimation technique to generate one of the one or more channel matrices.

7. The UE of claim 4, wherein the channel estimation technique comprises one of:
an instantaneous channel estimation technique, or
a statistics-based channel estimation technique.

8. The UE of claim 7, wherein the instantaneous channel estimation technique uses a number of reference signals that scales linearly with a number of antennas of the UE.

9. The UE of claim 7, wherein the statistics-based channel estimation technique uses a number of reference signals that scales quadratically with a number of antennas of the UE.

10. A network entity for wireless communication, comprising:
a memory; and
one or more processors, coupled to the memory, configured to:
transmit, to a user equipment (UE), configuration information indicating that the UE is to switch, based at least in part on at least one of a plurality of conditions being met, from using a static analog beamforming codebook to using a dynamic analog beam weight calculation for selecting beam weights for communications between the UE and the network entity;
receive, from the UE, a request for one or more reference signals associated with the dynamic analog beam weight calculation; and
transmit, to the UE, the one or more reference signals.

11. The network entity of claim 10, wherein the plurality of conditions comprises:
a UE signal blockage condition,
a performance requirement condition associated with the UE,
a channel environment condition, or
some combination thereof.

12. The network entity of claim 10, wherein the request is associated with a short burst of multiple reference signals.

13. The network entity of claim 10, wherein the request is associated with a long burst of multiple reference signals.

14. The network entity of claim 10, wherein the one or more reference signals include a plurality of reference signals transmitted via a same antenna port of the network entity.

15. The network entity of claim 10, wherein the one or more processors are further configured to:
receive, based at least in part on the one or more reference signals, an uplink communication from the UE.

16. A method of wireless communication performed by a user equipment (UE), comprising:
- determining, based at least in part on at least one of a plurality of conditions being met, to switch from using a static analog beamforming codebook to using a dynamic analog beamforming beam weight calculation for selecting beam weights for communications between the UE and a network entity;
- selecting the beam weights for the communications using the dynamic analog beam weight calculation; and
- communicating, using the beam weights, with the network entity.

17. The method of claim 16, wherein the plurality of conditions comprises:
- a UE signal blockage condition,
- a performance requirement condition associated with the UE,
- a channel environment condition, or
- some combination thereof.

18. The method of claim 16, wherein the beam weights are associated with at least:
- phase shifter quantization,
- amplitude control quantization, or
- some combination thereof.

19. The method of claim 16, wherein selecting the beam weights comprises:
- generating one or more channel matrices or one or more channel covariance matrices using a channel estimation technique; and
- selecting the beam weights using a channel matrix of the one or more channel matrices or the one or more channel covariance matrices.

20. The method of claim 19, further comprising:
- determining the channel estimation technique from a plurality of channel estimation techniques based at least in part on at least:
  - an amount of available computational power of the UE,
  - dimensions of an antenna array used by the UE,
  - a type of reference signal used for channel estimation,
  - a number of reference signals used for channel estimation,
  - a speed associated with the UE,
  - a latency requirement of an application associated with the UE,
  - a signal quality requirement associated with the UE, or
  - some combination thereof.

21. The method of claim 19, wherein generating the one or more channel matrices using the channel estimation technique comprises:
- requesting a number of reference signals from the network entity; and
- for each of the reference signals, using the channel estimation technique to generate one of the one or more channel matrices.

22. The method of claim 19, wherein the channel estimation technique comprises one of:
- an instantaneous channel estimation technique, or
- a statistics-based channel estimation technique.

23. The method of claim 22, wherein the instantaneous channel estimation technique uses a number of reference signals that scales linearly with a number of antennas of the UE.

24. The method of claim 22, wherein the statistics-based channel estimation technique uses a number of reference signals that scales quadratically with a number of antennas of the UE.

25. A method of wireless communication performed by a network entity, comprising:
- transmitting, to a user equipment (UE), configuration information indicating that the UE is to switch, based at least in part on at least one of a plurality of conditions being met, from using a static analog beamforming codebook to using a dynamic analog beam weight calculation for selecting beam weights for communications between the UE and the network entity;
- receiving, from the UE, a request for one or more reference signals associated with the dynamic analog beam weight calculation; and
- transmitting, to the UE, the one or more reference signals.

26. The method of claim 25, wherein the plurality of conditions comprises:
- a UE signal blockage condition,
- a performance requirement condition associated with the UE,
- a channel environment condition, or
- some combination thereof.

27. The method of claim 25, wherein the request is associated with a short burst of multiple reference signals.

28. The method of claim 25, wherein the request is associated with a long burst of multiple reference signals.

29. The method of claim 25, wherein the one or more reference signals include a plurality of reference signals transmitted via a same antenna port of the network entity.

30. The method of claim 25, further comprising:
- receiving, by the network entity and based at least in part on the one or more reference signals, an uplink communication from the UE.

* * * * *